Henry G. Thompson.
Imp't. in cooling the journals of car wheel axles.
112512     Fig. 1.     PATENTED MAR. 7 1871
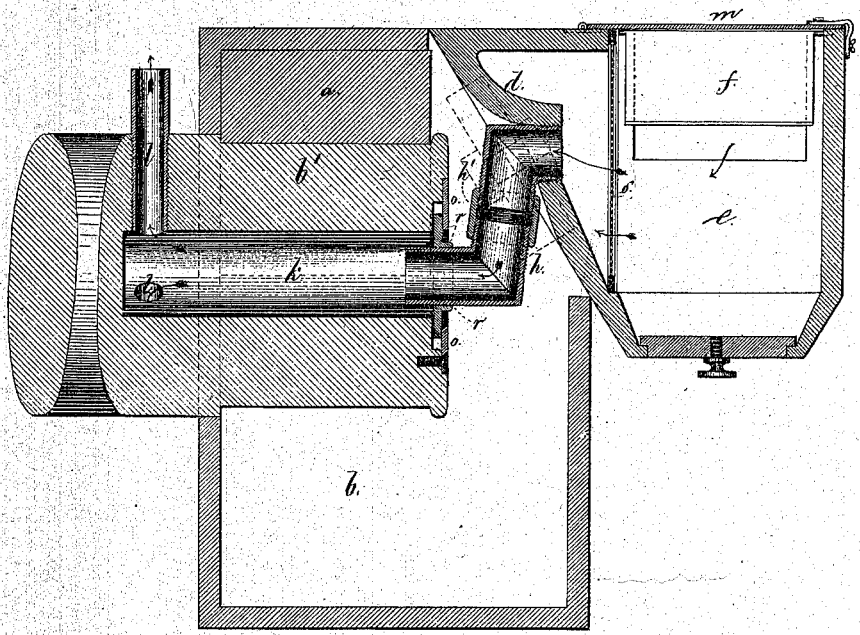
Fig. 2.
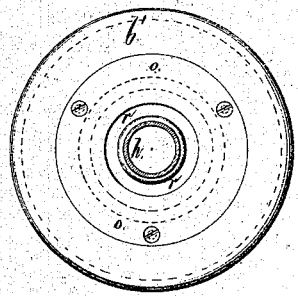
Witnesses
Chas. A. Smith
Geo. A. Walker
Henry G. Thompson
L. W. Serrell att'y

United States Patent Office.

HENRY G. THOMPSON, OF MILFORD, CONNECTICUT.

Letters Patent No. 112,512, dated March 7, 1871.

IMPROVEMENT IN COOLING JOURNALS OF CAR-WHEEL AXLES.

The Schedule referred to in these Letters Patent and making part of the same

*To all whom it may concern:*

Be it known that I, HENRY G. THOMPSON, of Milford, in the county of New Haven and State of Connecticut, have invented an Improvement in Cooling the Journals of Car-wheel Axles, and the following is declared to be a correct description of the same.

This invention is made for keeping dust and grease from getting into and filling up the hollow axle, when a current of air is caused to pass through that axle to cool the same and prevent an accumulation of frictional heat.

I employ a cap-plate, retained by a flat ring at the end of the journal, into which cap-plate the air-nozzle passes, and said cap-plate is free to move behind the flat ring, so as to allow for any movement between the axle and the box, but excludes oil or grease passing from the box into the hollow journal, and at the same time prevents dust passing out into the oil-chamber of the journal-box.

I also employ a screen that is movable, so as to be taken out with facility for cleaning, and the tubular nozzle is adjustable, so that the wear of the axle and box can be compensated In the drawing—

Figure 1 is a longitudinal section of the journal and parts connected therewith, and Figure 2 is an end view of the journal.

The journal-box or bearing $a$ and oil-box $b$ are of any ordinary character.

The axle $b'$ is made as a journal at the end, upon which the bearing $a$ rests.

The cap $d$ of the oil-box is made with an air-chamber $e$, having an entrance at each end, inside of which are swinging flaps $f$, one of which opens inward at the advancing end, to admit a current of air, and the other closes at the rear end, so that a current of air is obtained to pass into the chamber $e$, thence through the screen $g$, tubular nozzle $h$, and hollow journal $b'$, and pass away by the tubes $l$.

The screen $g$ is movable, so that it may be taken out for clearing, and for this purpose the cover $m$ is to be lifted and the screen $g$ drawn up out of slides that receive the ends.

The tubular nozzle $h$ is made of bends, so that the nozzle portion $h$ may be screwed into the sleeve $h'$, to raise up the nozzle, to keep it nearly central with the hollow journal $b'$ as said journal and the bearing $a$ wear.

At the end of the hollow journal the ring $o$ is attached, there being a cavity behind said ring $o$, and between the same and the journal in which the cap-plate $r$ is inserted.

This cap-plate $r$ is annular, so that the nozzle $h$ passes through the same.

It will now be understood that the cap-plate $r$ is free to move between the flat ring $o$ and the end of the axle or journal, but the same prevents oil passing into the hollow journal, and also prevents air and dust passing into the oil-chamber $b$, and the plate $r$ is free to accommodate itself to the position of the nozzle and allow the free rotation of the axle.

I claim as my invention—

1. The cap-plate $r$ and flat ring $o$, in combination with the tubular nozzle $h$ and hollow journal $b'$, substantially as and for the purposes specified.

2. The movable screen $g$, applied between the air-chamber $e$ and the hollow journal, in combination with the nozzle $h$, to convey air into the hollow axle, as and for the purposes set forth.

Signed this 8th day of December, A. D. 1870.

HENRY G. THOMPSON.

Witnesses:
CHAS. H. SMITH,
GEO. T. PINCKNEY.